United States Patent [19]

Hagman

[11] 4,369,808
[45] Jan. 25, 1983

[54] DISC-TYPE CHECK VALVE

[76] Inventor: Emanuel F. Hagman, Box 594, Drayton Valley, Alberta, Canada

[21] Appl. No.: 227,365

[22] Filed: Jan. 22, 1981

[51] Int. Cl.³ .............................................. F16K 15/02
[52] U.S. Cl. ............................. 137/515.5; 137/533.19
[58] Field of Search ....................... 137/533.17, 533.19, 137/543.19, 543.21, 515.5, 533.13

[56] References Cited

U.S. PATENT DOCUMENTS

| | | | |
|---|---|---|---|
| 325,074 | 8/1885 | Gordon | 137/533.19 X |
| 948,169 | 2/1910 | Garber | 137/533.19 X |
| 966,390 | 8/1910 | Elder | 137/533.19 X |
| 2,021,351 | 11/1935 | Carson | 137/533.19 X |
| 2,649,277 | 8/1953 | Blackford | 137/515.5 |
| 2,722,232 | 11/1955 | Roche | 137/515.5 |
| 3,084,709 | 4/1963 | Flick | 137/543.19 X |
| 3,620,653 | 11/1971 | Gaylord | 137/515.5 X |

*Primary Examiner*—Robert G. Nilson
*Attorney, Agent, or Firm*—Max L. Wymore

[57] ABSTRACT

The valve comprises a bored housing formed of two segments. A discrete annular seat member is positioned on an annular shoulder formed in one segment. A guide member, comprising spaced apart legs and an apertured end wall is positioned on the seat member. A cylindrical, resilient plastic disc is positioned to seat against the seat member to close off flow through the bore and to slide within the guide member when unseated. Flow bypasses the unseated disc by moving through the spaces between the guide member legs and out through the end wall aperture. The plastic disc provides a particularly good seal and thus erosion of the seat is diminished. Having the seat member removable reduces reconditioning costs.

1 Claim, 6 Drawing Figures

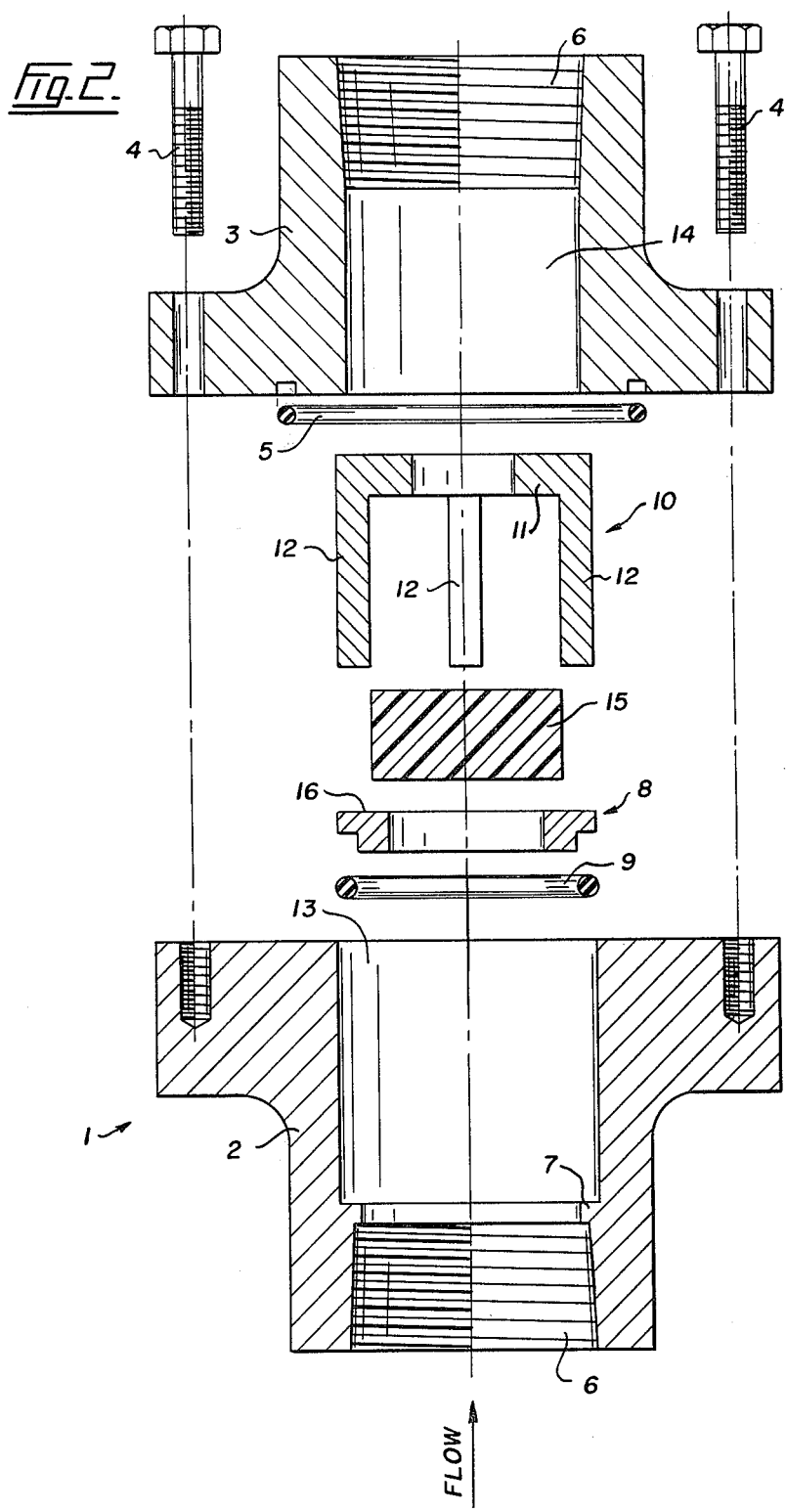

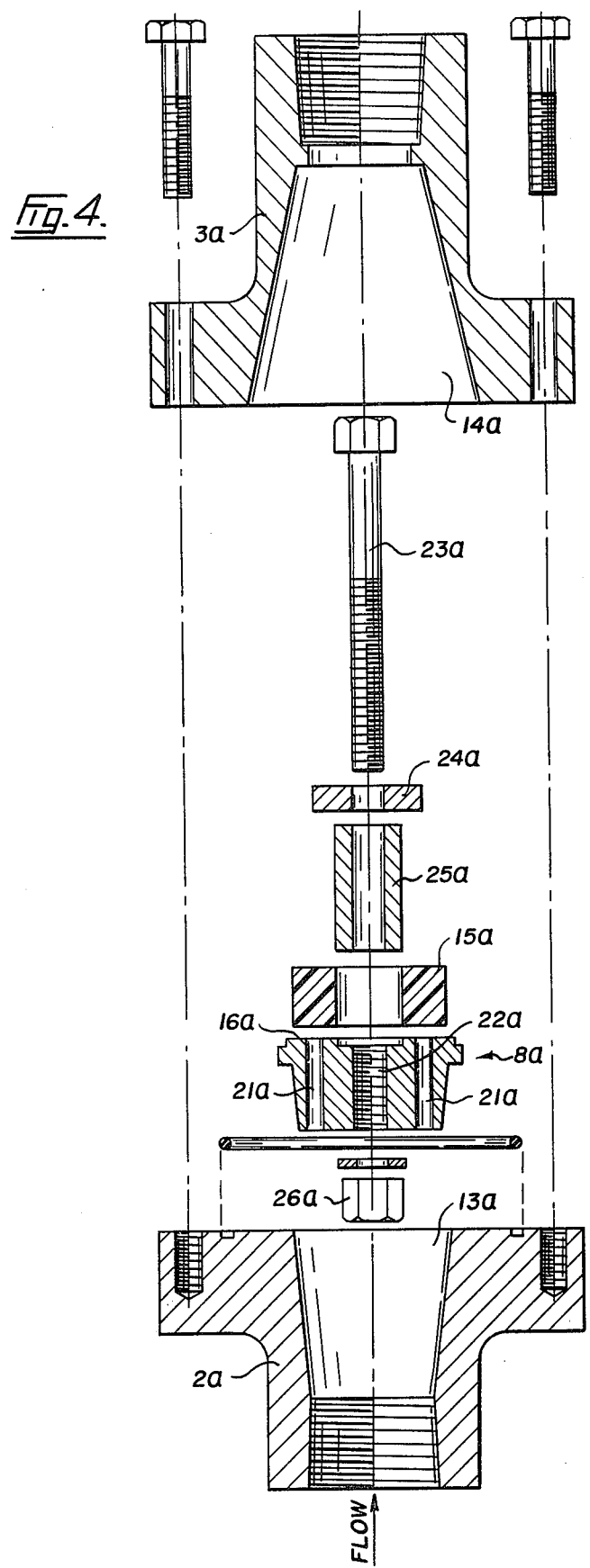

DISC-TYPE CHECK VALVE

FIELD OF THE INVENTION

This invention relates to a check valve which finds particular use in corrosive service, such as in the lines of oilfield water injection systems.

BACKGROUND OF THE INVENTION

While use of the valve is not limited to oilfield water injection systems, it has been developed in connection with such systems; thus its advantages will be better understood by discussing the shortcomings of the valves heretofore used in that service.

It is conventional to use flapper check valves in water injection systems, due to the rapid erosion of the valve seat which takes place. The flapper valve has been chosen because the area of contact between valve and seat is relatively large when compared with alternatives, such as ball and dart valves.

However, even flapper check valves commonly fail very quickly in this service. By way of example, they usually involve springs which quickly corrode and break. Also, the seal between the flapper and the seat is not as effective as it might be and water erosion and corrision of the corner of the seat frequently occurs in a few months.

As a further disadvantage, the commonly used flapper valves, of which I am aware, normally have a valve seat formed integrally in the wall of the valve body; because the seat is not removable, reconditioning of it is difficult and expensive. Since these valves in some cases have to be repaired every two or three months, the cost of maintenance is accordingly high.

There is thus a need for a valve which provides improved durability and ease of reconditioning.

SUMMARY OF THE INVENTION

The present invention is based on the notion of utilizing a resilient plastic disc as the valve element. This valve element seats against an annular seat formed in the valve body to provide closure against flow; when unseated, it moves longitudinally along guide means disposed within the valve body bore. This bore is greater than the outside diameter of the disc and the guide means is adapted to permit fluid flow through when the disc is unseated.

The hard, resilient plastic disc seals especially well against the valve body seat across a comparatively larger contact area, when compared with the contact area of a flapper check valve of the same size. Thus leakage is significantly diminished and erosion is reduced.

In a preferred form of the invention, an accessible, removable valve seat is combined with the guided plastic disc. Reconditioning costs are accordingly reduced. This combination thus provides a durable valve which requires reconditioning only occasionally and which may be reconditioned at relatively reduced cost.

Broadly stated, the invention is a check valve comprising a valve body having a longitudinal bore extending therethrough; an annular seat associated with said body; a resilient plastic disc positioned in the bore and adapted to seat on the valve seat to stop flow through the bore, said disc having a reduced diameter relative to that of the bore so that flow around the disc may take place when it is unseated; and removable guide means, positioned in the bore downstream of the valve seat, for guiding the disc when it moves while permitting flow to take place past the disc when it is unseated.

In another broad aspect, the invention is a check valve comprising a valve body having separable inlet and outlet segments forming a longitudinal bore extending therethrough; a discrete removable seat member positioned in and supported by the inlet segment and providing an annular valve seat; a resilient plastic disc adapted to seat on the valve seat to stop flow through the bore; removable guide means, positioned in the bore immediately downstream of the seat member and containing the disc, for guiding said disc when it moves off the valve seat and enabling flow to move past said disc when it is unseated; and disengagable means for holding the body segments together.

DESCRIPTION OF THE DRAWINGS

FIG. 2 is an exploded view of the embodiment of FIG. 1;

FIG. 4 is an exploded view of the embodiment shown in FIG. 3;

DESCRIPTION OF THE PREFERRED EMBODIMENTS

First Embodiment

Figure 1:
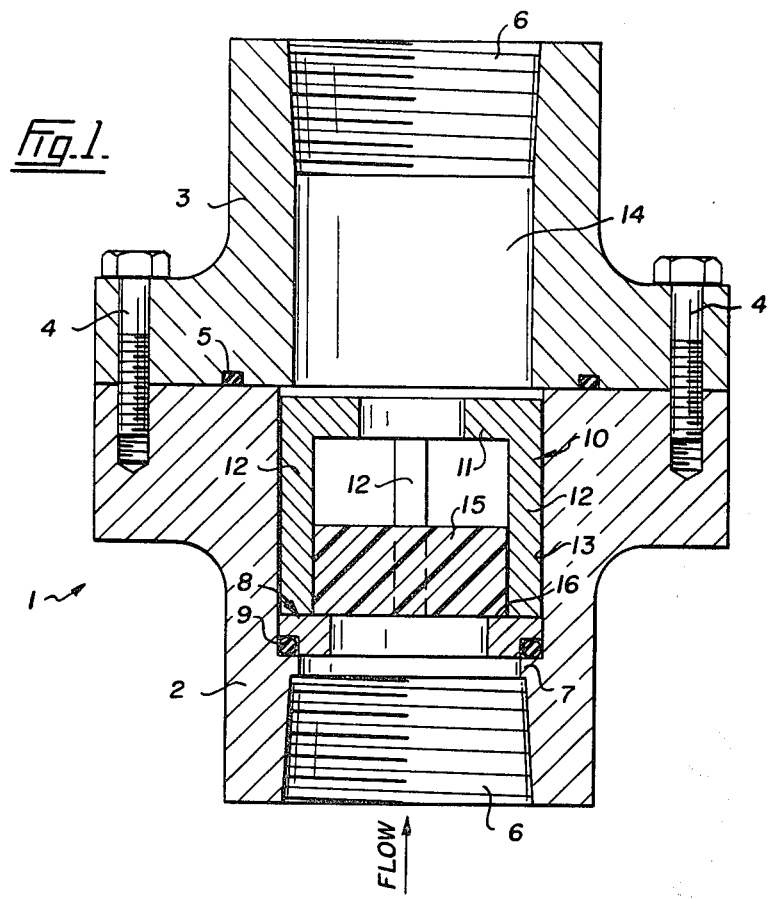
FIG. 1 is a sectional side view of an assembled first embodiment of the valve involving a guide member, a disc, a two-piece housing, and a removable seat member.

With reference to FIG. 1, the valve comprises inlet and outlet housing segments 2, 3. The housing segments 2, 3 are held together by bolts 4 and are sealed at their contact surfaces by an O-ring 5. A longitudinal flow bore 6 extends through the housing segments 2, 3. These segments 2, 3 are threaded internally at the ends of the bore 6 so that the valve 1 may be tied into a flow line (not shown).

The inlet housing 2 forms an inwardly extending annular shoulder 7. A discrete, removable annular seat member 8 seats on this shoulder 7. An O-ring 9 carried by the seat member 8 functions to seal the latter against the housing segment 2 to prevent leakage.

Figure 6:
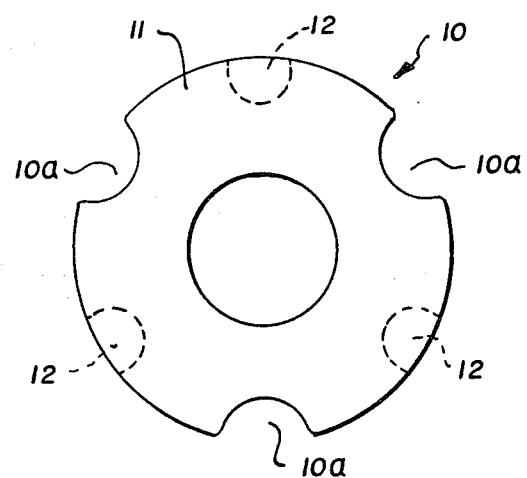
FIG. 6 is an end view of the guide member.

A guide member 10, having an apertured end wall 11 and spaced legs 12, fits snugly within the inlet housing segments bore portion 13 and abuts the seat member 8. As shown in FIG. 6, the guide member 10 has peripheral flow passages 10a, for a purpose to be explained.

A circular disc 15 is positioned in the guide member 10. This disc is formed of hard, resilient plastic, such as that available under the trade mark DELRIN from Johnston Plastics Ltd., Edmonton, Alberta, Canada. The disc 15 is adapted to seal against the valve seat 16 of the seat member 8. When unseated by upstream pressure, it slides within the guide member 10 until stopped by the end wall 11.

When the disc 15 is unseated, flow will bypass the disc by moving through the spaces between the guide legs 12 and move past the end wall 11 through the peripheral flow passages 10a.

Second Embodiment

Figure 3:
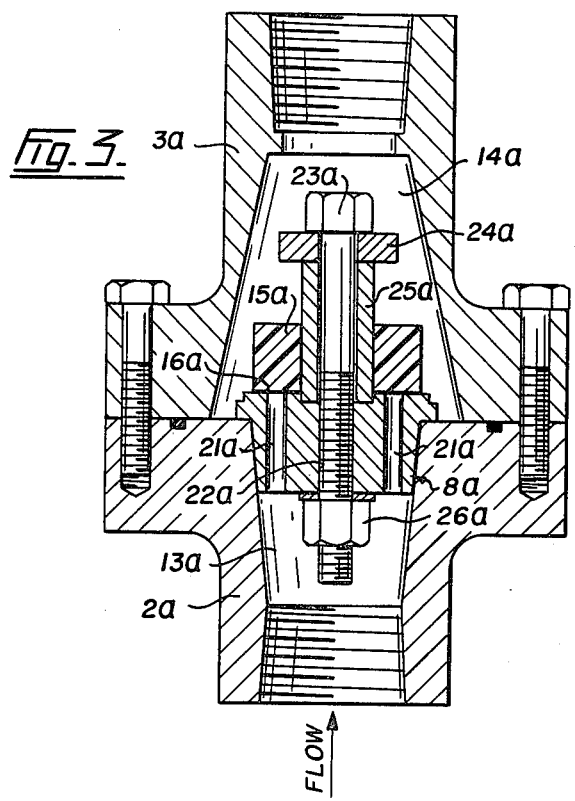
FIG. 3 is a sectional side view of an assembled second embodiment of the valve involving a guide member, a bored disc, a two-piece housing, and a removable seat member having flow passages therethrough.

This embodiment is shown in FIG. 3. It too comprises a valve body having inlet and outlet segments 2a, 3a bolted together and sealed by an O-ring. In this case, the bore has tapered inlet and outlet portions 13a, 14a.

A discrete, tapered seat member 8a seats snugly in the bore inlet portion 13a. The seat member 8a has flow passages 21a extending therethrough which terminate at the annular seat 16a.

A bolt 23a extends through a central bore 22a formed in the seat member 8a. The bolt 23a is retained in place by a nut 26a and washer. At its head end, the bolt 23a carries a guide sleeve 25a on which is mounted an annular disc 15a. The disc 15a is adapted to seal against the seat 16a and close the flow passages 21a. If displaced from the seat 16a by upstream pressure, the disc 15a slides on the guide sleeve 25a until it contacts the stop 24a.

In use, upstream pressure unseats the disc 15a and flow passes through the passages 21a and past the disc 15a through the bore 14a.

Third Embodiment

Figure 5:
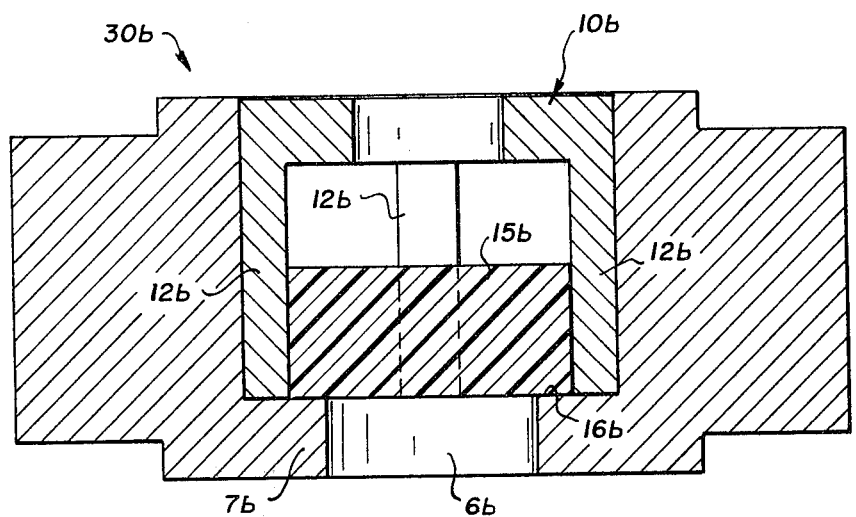
FIG. 5 is a sectional side view of an assembled third embodiment of the valve involving only a guide member, a disc, and a one-piece housing.

This embodiment is shown in FIG. 5. It comprises a valve body 30b having a flow bore 6b therethrough. The valve body 30b is intended to be inserted between suitably spaced flanges (not shown) which may be bolted together to hold the valve in place. The body 30b has a shoulder 7b which forms an annular seat 16b. A guide member 10b, having spaced legs 12b and flow passages 10a, abuts the shoulder 7b. A disc 15b is positioned to slide in the guide member 10b and close off the flow bore 6b by seating on the seat 16b.

When the disc 15b is unseated, flow moves through the spaces, between the legs 12b, and flow passages 10a.

Applications

The first embodiment is normally used in new installations where the flow line is greater than 1" in diameter. The second embodiment is useful in small diameter applications, where the incorporation of a cage-type guide member is difficult to accommodate. And the third embodiment finds application as a replacement valve in existing installations where flanged valves are already in use.

Obvious variations in the specific details described may be made without departing from the spirit of the invention and such embodiments of the invention as come within the scope and purview of the appended claims are to be considered as part of this invention.

The embodiments of the invention in which an exclusive property or privilege is claimed are defined as follows:

1. A check valve comprising:
   a valve body having separate inlet and outlet segments forming a longitudinal bore extending therethrough, said segments being bolted together and having O-ring seal means sealing their contacting surfaces;
   a discrete removable annular seat member positioned in the bore and supported by the inlet segment and providing a flat annular upper surface for functioning as a valve seat;
   O-ring seal means, positioned between the seat member and inlet segment, for preventing leakage between them;
   a resilient plastic disc adapted to seat on the seat member to stop flow through the bore; and
   removable guide means, positioned in the bore on the seat member and containing the disc, for guiding the disc when it moves off the valve seat and enabling flow to move past said disc when it is unseated, said guide means consisting of an end wall and depending spaced legs which stand on the seat member, said end wall forming at least one central aperture and peripheral flow passages, whereby liquid may flow between the legs and through said aperture and flow passages when the disc is unseated.

* * * * *